United States Patent
Zhu et al.

(10) Patent No.: US 8,754,559 B2
(45) Date of Patent: Jun. 17, 2014

(54) ROTOR AND ROTARY ELECTRIC MACHINE CONTAINING THE SAME

(71) Applicant: Delta Electronics (Shanghai) Co., Ltd., Shanghai (CN)

(72) Inventors: Hong-Liu Zhu, Shanghai (CN); Jian-Ping Ying, Shanghai (CN); Shi-Xiang Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/728,750

(22) Filed: Dec. 27, 2012

(65) Prior Publication Data
US 2013/0134820 A1    May 30, 2013

Related U.S. Application Data

(63) Continuation-in-part of application No. 13/306,749, filed on Nov. 29, 2011.

(30) Foreign Application Priority Data

Aug. 13, 2012   (CN) .......................... 2012 1 0287326

(51) Int. Cl.
   *H02K 1/27*    (2006.01)
(52) U.S. Cl.
   CPC ............ *H02K 1/2713* (2013.01); *H02K 1/2706* (2013.01); *H02K 1/2766* (2013.01)
   USPC ............ 310/156.48; 310/156.55; 310/156.57; 310/156.64

(58) Field of Classification Search
   None
   See application file for complete search history.

(56) References Cited

U.S. PATENT DOCUMENTS

| 7,986,068 B2 * | 7/2011 | Suzuki et al. ............ 310/156.22 |
| 8,018,111 B2 * | 9/2011 | Kinjou et al. ............ 310/156.57 |

FOREIGN PATENT DOCUMENTS

JP    2001086673 A  *  3/2001  ............... H02K 1/27

* cited by examiner

*Primary Examiner* — Tran Nguyen
(74) *Attorney, Agent, or Firm* — CKC & Partners Co., Ltd.

(57) ABSTRACT

A rotor and a rotary electric machine containing the rotor are provided. The rotor includes a shaft, a rotor core coaxially connected to the shaft, a first axial magnetic steel and a second axial magnetic steel disposed at an end surface of the rotor core, a rotor bushing, and a first magnetic isolation groove. The first axial magnetic steel has a first magnetic pole facing the rotor core. The second axial magnetic steel has a second magnetic pole facing the rotor core. The rotor bushing is disposed at a side of the first and second axial magnetic steels opposite to the rotor core. The first magnetic isolation groove is formed in the rotor core along a radius direction of the rotor core. The first magnetic isolation groove is disposed between the first axial magnetic steel and the second axial magnetic steel to isolate the first pole and the second pole.

18 Claims, 13 Drawing Sheets

A-A

B-B

ROTOR AND ROTARY ELECTRIC MACHINE CONTAINING THE SAME

RELATED APPLICATIONS

The present application is a continuation-in-part application of U.S. application Ser. No. 13/306,749, filed Nov. 29, 2011, which itself claims priorities to Chinese Patent Application Serial Number 201110240463.1, filed Aug. 19, 2011. The present application also claims priority under 35 U.S.C. §119(a) on Chinese Patent Application Serial Number 201210287326.8 filed Aug. 13, 2012. The entire contents of the above identified applications are hereby incorporated by reference.

BACKGROUND

1. Field of Invention

The invention relates to a rotary electric machine. More particularly, the invention relates to a rotary electric machine with a structure design of permanent magnet (PM).

2. Description of Related Art

A preferred material for forming a PM of an electric machine is neodymium iron boron. However, currently, the price of rare earth materials is rising; and therefore in order to reduce the cost, it is expected in this industry to use permanent magnet materials (such as ferrites) with weak magnetic properties but low price to replace the neodymium iron boron. However, since the remanence of the ferrite material is only 0.2-0.44 T, and the maximum magnetic energy product thereof is only 6.4-40 kJ/m$^3$, a simple replacement may cause decrease in output power and efficiency of the electric machine.

Thus, in the background art, methods such as increasing the axial length of a rotor and increasing tangential magnetic steel's width are used for increasing the sectional area of the magnetic steel and improving the output power. However, these methods result in the volume and cost increase of the electric machine. A composite rotor magnetic path structure is also used in the background art. That is, magnetic steels are arranged along both the tangential and the radial directions in the rotor. However, this structure can only use a space within the rotor diameter to place the magnetic steels, and thus the space for receiving the magnetic steels limited.

In view of this, it is a problem desired to be solved by those of relevant skills in this industry regarding how to design an electric machine, in which the air gap flux density is improved, and hence the output power of the electric machine is improved without increasing the total volume thereof.

SUMMARY

In order to solve the technical issues mentioned above, an aspect of the invention is to provide a rotor, which includes a shaft, a rotor core coaxially connected to the shaft, a first axial magnetic steel disposed at an end surface of the rotor core, a second axial magnetic steel disposed at the end surface of the rotor core, a rotor bushing, and a first magnetic isolation groove. The first axial magnetic steel has a first magnetic pole facing the rotor core. The second axial magnetic steel has a second magnetic pole facing the rotor core. The rotor bushing is disposed at a side of the first axial magnetic steel and the second axial magnetic steel opposite to the rotor core. The first magnetic isolation groove is formed in the rotor core along a radius direction of the rotor core. The first magnetic isolation groove is disposed between the first axial magnetic steel and the second axial magnetic steel to isolate the first pole and the second pole.

In one or more embodiments of the aspect, the rotor further includes a second magnetic isolation groove disposed in the rotor core and disposed at an end of the first magnetic isolation groove close to the shaft, wherein the second magnetic isolation groove is extended toward the first pole, the second pole, or both of the first and the second poles.

In one or more embodiments of the aspect, the shaft is made of a magnetic material.

In one or more embodiments of the aspect, the second magnetic isolation groove is a curved groove or a linear groove.

In one or more embodiments of the aspect, the second magnetic isolation groove is symmetrical along an axial extending line of the first magnetic isolation groove.

In one or more embodiments of the aspect, the second magnetic isolation groove is disposed along a tangential direction of the shaft and is disposed on the first pole or the second pole.

In one or more embodiments of the aspect, the rotor further includes a first magnetic steel disposed in the first magnetic isolation groove, the first magnetic steel having a third pole and a fourth pole, wherein the third pole is disposed next to the first pole, and the third pole and the first pole repel each other; the fourth pole is disposed next to the second pole, and the fourth pole and the second pole repel each other.

In one or more embodiments of the aspect, the motor further includes a second permanent magnet disposed in the second magnetic isolation groove, wherein the second permanent magnet has the same magnetizing direction with the magnetic pole of which located on.

In one or more embodiments of the aspect, the first magnetic steel or the second permanent magnet is made of ferrite or NdFeB.

Another aspect of the invention provides a rotary electric machine comprising an electric machine stator formed from a plurality of stator windings and a stator core, and a rotor formed from a rotor core and a shaft, wherein an air gap is provided between the electric machine stator and the rotor. The rotor further includes a first axial magnetic steel disposed at an end surface of the rotor core, a second axial magnetic steel disposed at the end surface of the rotor core, a rotor bushing, and a first magnetic isolation groove. The first axial magnetic steel has a first magnetic pole facing the rotor core. The second axial magnetic steel has a second magnetic pole facing the rotor core. The rotor bushing is disposed at a side of the first axial magnetic steel and the second axial magnetic steel opposite to the rotor core. The first magnetic isolation groove is formed in the rotor core along a radius direction of the rotor core, wherein the first magnetic isolation groove is disposed between the first axial magnetic steel and the second axial magnetic steel to isolate the first pole and the second pole, whereby a plurality of magnetic field lines pass through the air gap.

In one or more embodiments of the aspect, the rotary electric machine further includes a second magnetic isolation groove disposed in the rotor core and disposed at an end of the first magnetic isolation groove close to the shaft, wherein the second magnetic isolation groove is extended toward the first pole, the second pole, or both of the first and the second pole.

In one or more embodiments of the aspect, the shaft is made of a magnetic material.

In one or more embodiments of the aspect, the second magnetic isolation groove is a curved groove or a linear groove.

In one or more embodiments of the aspect, the second magnetic isolation groove is symmetrical along an axial extending line of the first magnetic isolation groove.

In one or more embodiments of the aspect, the second magnetic isolation groove is disposed along a tangential direction of the shaft.

In one or more embodiments of the aspect, the rotary electric machine further includes a first magnetic steel disposed in the first magnetic isolation groove, the first magnetic steel having a third pole and a fourth pole, wherein the third pole is disposed next to the first pole, and the third pole and the first pole repel each other; the fourth pole is disposed next to the second pole, and the fourth pole and the second pole repel each other.

In one or more embodiments of the aspect, the rotary electric machine further includes a second permanent magnet disposed in the second magnetic isolation groove, wherein the second permanent magnet has the same magnetizing direction with the magnetic pole of which located on.

In one or more embodiments of the aspect, the first magnetic steel or the second permanent magnet is made of ferrite or NdFeB.

To sum up, in the rotary electric machine provided by the invention, axial magnetic steels are installed at two ends of the rotor core, so that the air gap flux density may be improved and the output power of the electric machine may be enlarged without increasing the original volume of the electric machine.

BRIEF DESCRIPTION OF THE DRAWINGS

In order to make the foregoing as well as other aspects, features, advantages, and embodiments of the invention more apparent, the accompanying drawings are described as follows.

DETAILED DESCRIPTION

The invention will be described in details in the following embodiments with reference to the accompanying drawings, but these embodiments are not intended to limit the scope of the invention. The description of structure operation does not mean to limit its implementation order. Any device with equivalent functions that is produced from a structure formed by recombination of elements shall fall within the scope of the invention. The drawings are only illustrative and are not made according to the original size.

Figure 1:
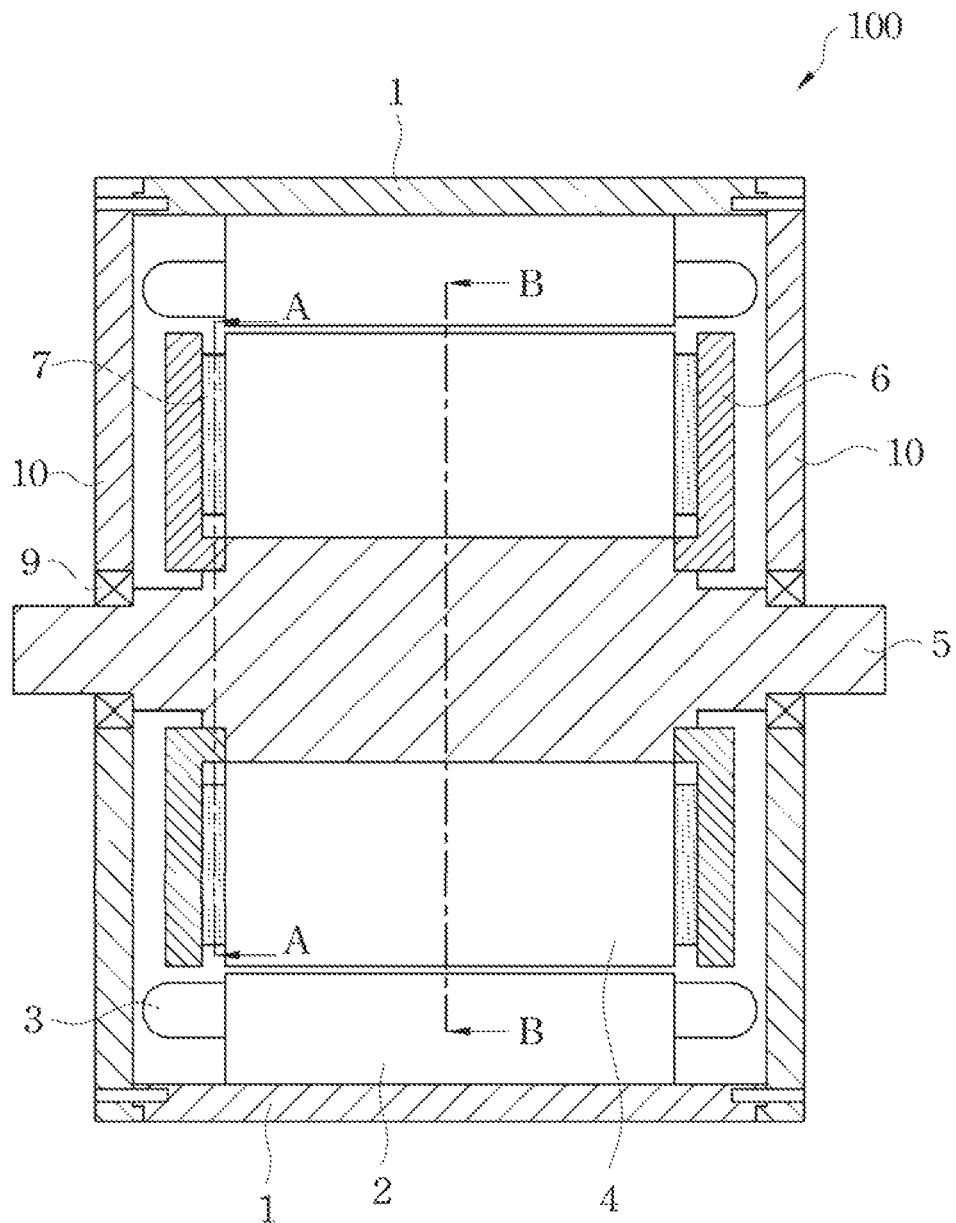
FIG. 1 is a cross-sectional view of an electric machine in an embodiment of the invention.
Figure 2:
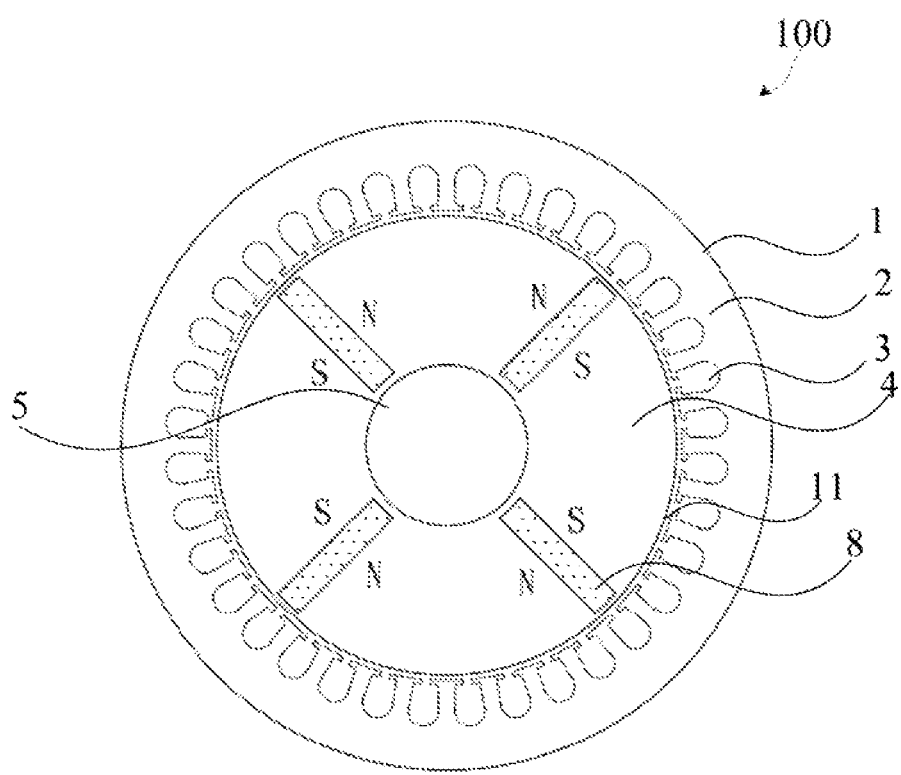
FIG. 2 is a cross-sectional view of the rotary electric machine shown in FIG. 1.

Referring to FIG. 1, FIG. 1 is a cross-sectional view of an electric machine in an embodiment of the invention. As shown in FIG. 1, a rotary electric machine 100 includes a shell 1, a stator core 2, stator windings 3, a rotor core 4, a shaft 5, a rotor bushing 6, an axial magnetic steel 7, a tangential magnetic steel 8 (as shown in FIG. 2), a shaft bearing 9 and an end cover 10. An electric machine stator is formed from the stator core 2 and the stator windings 3. A rotor is formed from the axial magnetic steel 7, the tangential magnetic steel 8, the rotor core 4, the shaft 5, the shaft bearing 9 and the rotor bushing 6 fixed at two ends of the rotor. The electric machine stator and the rotor are installed in the end cover 10 and the shell 1. Moreover, the rotary electric machine 100 provided in the invention is a permanent magnet electric machine.

Figure 3:
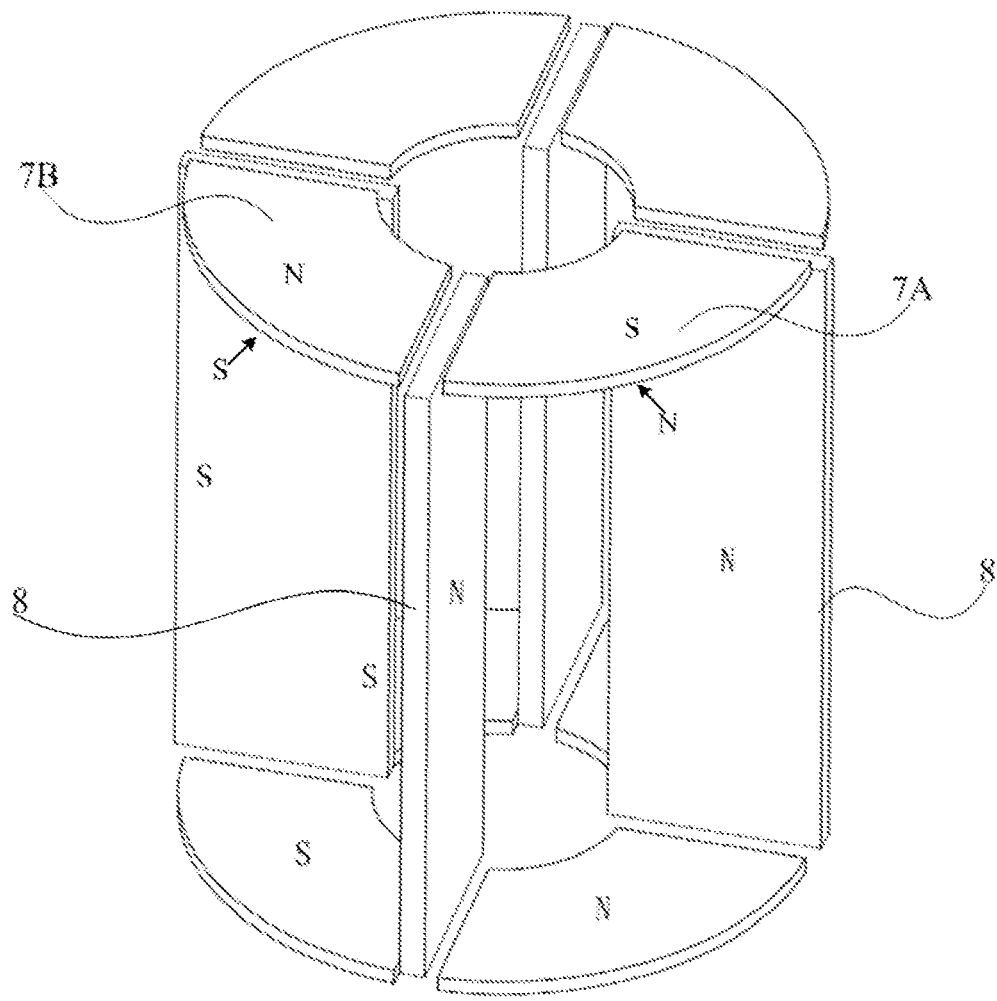
FIG. 3 is a schematic perspective view of a magnetic steel in FIG. 1.

Referring to FIGS. 2 and 3, FIG. 2 is a cross-sectional view of the rotary electric machine in FIG. 1, and FIG. 3 illustrates a schematic perspective view of the magnetic steel in FIG. 1. As shown in FIG. 2, in this embodiment, the tangential magnetic steel 8 is of a 4-pole structure, and each pole includes an S pole and an N pole. However, in other embodiments, for example, the tangential magnetic steel 8 may be of a 6-pole or 8-pole structure, but not limited thereto. Additionally, it is known from FIG. 2 that an air gap 11 is provided between the electric machine stator and the rotor. As shown in FIG. 3, the magnetic steel includes the axial magnetic steel 7 and the tangential magnetic steel 8. The material forming the axial magnetic steel 7 and the tangential magnetic steel 8 is preferably ferrite, and for example, the material may also be neodymium iron boron, but not limited thereto.

The specific structure of the rotary electric machine 100 in this embodiment will be described with reference to FIGS. 1, 2 and 3 hereinafter.

In this embodiment, each tangential magnetic steel 8 is installed in a respective rotor core 4, and each tangential magnetic steel 8 has magnetic poles S and N. The axial magnetic steel 7 is installed at the end surface (in the axial zone) of the rotor core 4 and is adjacent to the tangential magnetic steel 8. The magnetizing direction of the axial magnetic steel 7 is parallel to the shaft 5. The magnetizing directions of two adjacent axial magnetic steels 7 are opposite to comply with a polar parallelism relation. For example, the axial magnetic steel 7A and the axial magnetic steel 7B have opposite polarities. In this embodiment, the axial magnetic steel 8 and the tangential magnetic steel 7 comply with a polar parallelism relation. As shown in FIG. 3, the magnetic pole of the axial magnetic steel 7A at the face adjacent to the rotor core 4 is an N pole, and thus the magnetic pole of the tangential magnetic steel 8 at the face adjacent to the N pole of the axial magnetic steel 7A is an N pole, wherein the two N poles repel with each other, and vice versa, the magnetic pole of the axial magnetic steel 7B at the face adjacent to the rotor core 4 is an S pole, and thus the magnetic pole of the tangential magnetic steel 8 at the face adjacent to the S pole of the axial magnetic steel 7B is an S pole. Other axial magnetic steels 7 and tangential magnetic steels 8 also comply with similar polar relations, and no further description will be stated herein.

It should be noted that the number and installing position of the axial magnetic steels 7 are not limited thereto, as long as the number satisfies the polar parallelism relation, and the installing position is in the axial zone. For example, if the number of the axial magnetic steels 7 is two, the axial magnetic steels 7 may be both installed at one end of the rotor core 4. If the number of the axial magnetic steels 7 is four, the axial magnetic steels 7 may be all installed at one end of the rotor core 4, or every two axial magnetic steels 7 may be installed at each end of the rotor core 4. If the number of the axial magnetic steels 7 is six, four axial magnetic steels 7 may be installed at one end of the rotor core 4, and two axial magnetic steels 7 may be installed at the other end of the rotor core 4. If the number of the axial magnetic steels 7 is eight, every four axial magnetic steels 7 may be installed at each end of the rotor core 4. The foregoing descriptions are merely stated for illustration, wherein the number of the axial magnetic steels 7 may be flexibly determined in accordance with the structure of the tangential magnetic steel 8 and the actual requirements, and the installing position may also be flexibly determined. In this embodiment, preferably, eight axial magnetic steels 7 are taken as an example for explanation, which are installed at two ends of the rotor core 4.

Additionally, the axial magnetic steel 7 is fixed at the end surface of the rotor core 4 through the rotor bushing 6. The rotor bushing 6 is fixed on the shaft 5. The stator formed from the stator core 2 and the stator windings 3 is installed in the shell 1. The shell 1 and the stator core 2 abut against each other, so as to fix the stator core 2. End covers 10 are respectively installed at two ends of the shell 1, and the end covers 10 are installed on the shaft 5 through the shaft bearing 9.

Referring to FIGS. 1 and 3 again, the position arrangement and relationship between the axial magnetic steels 7 and the tangential magnetic steels 8 are illustrated. The axial magnetic steels 7 are installed at the end surface of the rotor core 4, and the magnetizing directions of two adjacent axial magnetic steels 7 are opposite. In other words, the axial magnetic steels 7 at the same end surface are arranged in a magnetically staggered manner, such as the axial magnetic steels 7A and 7B. The tangential magnetic steels 8 are fixed in the rotor core 4 along the radial directions. Two tangential magnetic steels 8 facing each other magnetically repel with each other, and each tangential magnetic steel 8 is arranged between two axial magnetic steels 7. Moreover, the adjacent axial magnetic steel 7 and tangential magnetic steel 8 magnetically repel with each other. For example, if the magnetic pole of the axial magnetic steel 7A at the face adjacent to the rotor core 4 is an N pole, then the magnetic pole of the adjacent tangential magnetic steel 8 at the face adjacent to the N pole of the axial magnetic steel 7A is also an N pole, wherein the two N poles repel with each other. Similarly, if the magnetic pole of the axial magnetic steel 7B at the face adjacent to the rotor core 4 is an S pole, then the magnetic pole of the adjacent tangential magnetic steel 8 at the face adjacent to the S pole of the axial magnetic steel 7B is also an S pole.

Figure 4:
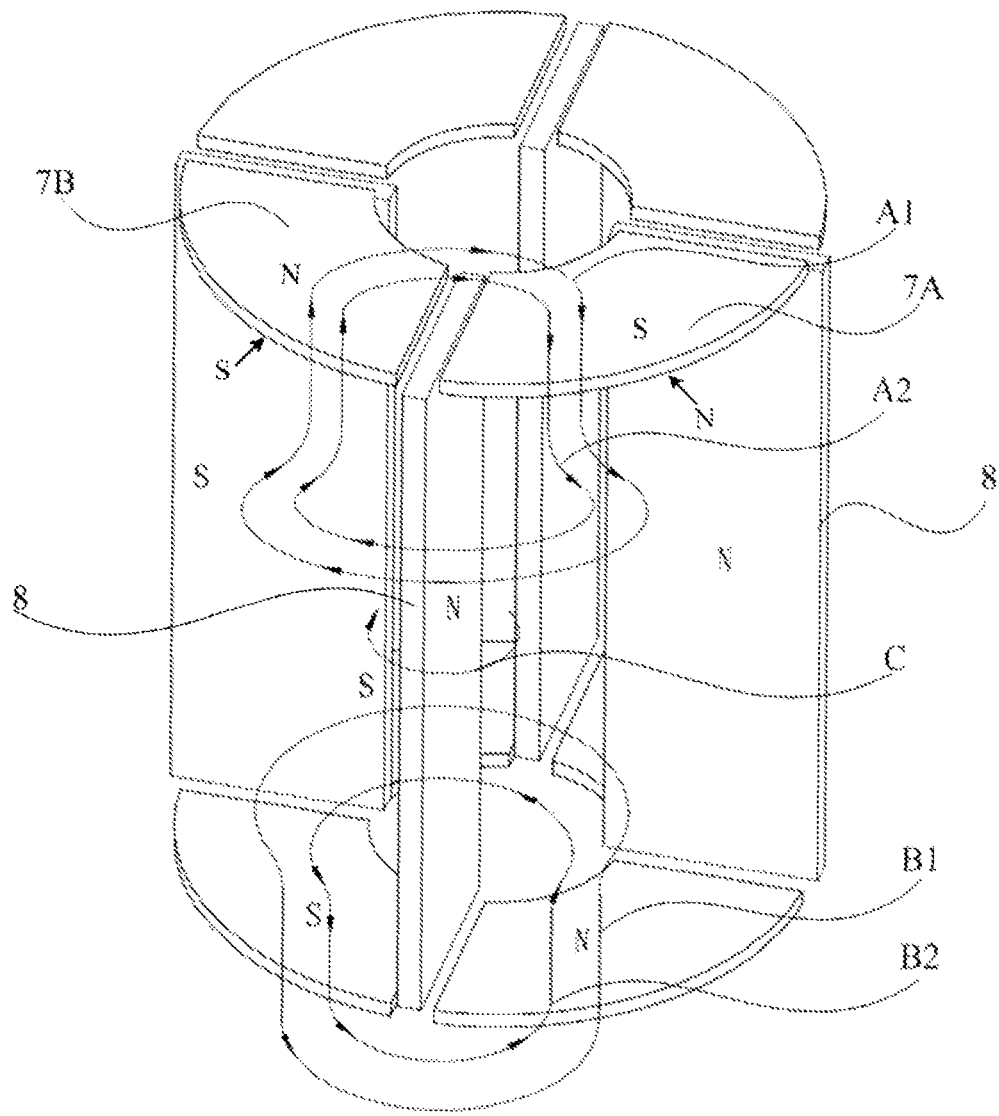
FIG. 4 is a schematic magnetic path view of the magnetic steel in FIG. 3.

Referring to FIGS. 2 and 4 at the same time, FIG. 4 is a schematic magnetic path view of the magnetic steel in FIG. 3. The magnetic path of the axial magnetic steel 7 is described in detail below. In this embodiment, adjacent axial magnetic steels 7A and 7B are taken as an example for explanation.

Firstly, the magnetic field line A1 extends from the N pole of the axial magnetic steel 7A (the magnetic pole adjacent to the rotor core 4) into the rotor core 4, and then proceeds in the rotor core 4 along a direction parallel to the shaft 5, and subsequently reaches the stator core 2 after passing through the air gap 11 between the stator and the rotor along the radial direction of the rotor core 4, and then returns to rotor core 4 from the stator core 2 through the air gap 11, and thereafter reaches the S pole of the adjacent axial magnetic steel 7B through the rotor core 4, and finally the magnetic field line A1 extends from the N pole of the adjacent axial magnetic steel 7B and returns to the S pole of the axial magnetic steel 7A through the rotor bushing 6, thereby forming a loop of the magnetic field line A1. The magnetic path of the magnetic field line A2 is similar to that of the magnetic field line A1, and thus no further description will be stated herein. The magnetic field lines B1 and B2 are respectively symmetrical with the magnetic field lines A1 and A2, and no further description will be stated herein. It should be noted that, in this embodiment, the magnetic field lines A1, A2, B1 and B2 of the axial magnetic steel 7 are merely depicted for illustration, and in practice, the axial magnetic steel 7 has countless magnetic field lines.

It should also be pointed out that, due to the presence of the tangential magnetic steel 8, the magnetic field line of the axial magnetic steel 7 is prevented from extending from the N pole of the axial magnetic steel along the rotor core 4 and directly entering the S pole of the adjacent axial magnetic steel without passing through the air gap 11 and the stator core 2. That is, the tangential magnetic steel 8 described herein has a function of magnetic isolation. Particularly, for example, the tangential magnetic steel 8 is provided between the adjacent axial magnetic steel 7A and axial magnetic steel 7B. It can be known from FIG. 4 (with reference to FIG. 1) that the magnetic pole of the axial magnetic steel 7A at the face adjacent to the rotor core 4 is an N pole, and the magnetic pole of the adjacent tangential magnetic steel 8 at the face adjacent to the N pole of the axial magnetic steel 7A is also an N pole, wherein the two N poles repel with each other. Thus, if the magnetic field line of the axial magnetic steel 7A is assumed to extend towards the direction of the tangential magnetic steel 8 after entering the rotor core 4, the magnetic field line would be blocked by the tangential magnetic steel 8, so that the magnetic field line of the axial magnetic steel 7A could not pass through the tangential magnetic steel 8. That is, the tangential magnetic steel 8 here has certain functions of magnetic isolation. The tangential magnetic steel 8 is fixed in the first magnetic isolation groove 20, the first magnetic isolation groove 20 has functions of magnetic isolation. The tangential magnetic steel 8 strengthened the functions of magnetic isolation and the flux density in air gap 11.

The magnetic field line C of the tangential magnetic steel 8 extends from the N pole of the tangential magnetic steel 8, and reaches the S pole of the tangential magnetic steel 8 through the air gap 11, and subsequently returns to the N pole of the tangential magnetic steel 8 through the inner part of the tangential magnetic steel 8. It should be noted that only one magnetic field line of the tangential magnetic steel 8 is depicted herein for illustration, and in practice, each tangential magnetic steel 8 has countless magnetic field lines similar to the magnetic field line C.

It can be known from the above description that, in this embodiment, the magnetic field lines passing through the air gap 11 may not only include the magnetic field lines generated by the tangential magnetic steel 8, but also include the magnetic field lines generated by the axial magnetic steel 7. That is, in comparison with the electric machine of the background art, the magnetic field lines in the air gap 11 also include the magnetic field lines generated by the axial magnetic steel 7, and thus the air gap flux density of the electric machine may be improved, and may hence the output power of the electric machine is improved without increasing the volume of the electric machine or materials of the stator core, stator windings and the rotor core.

Figure 5:
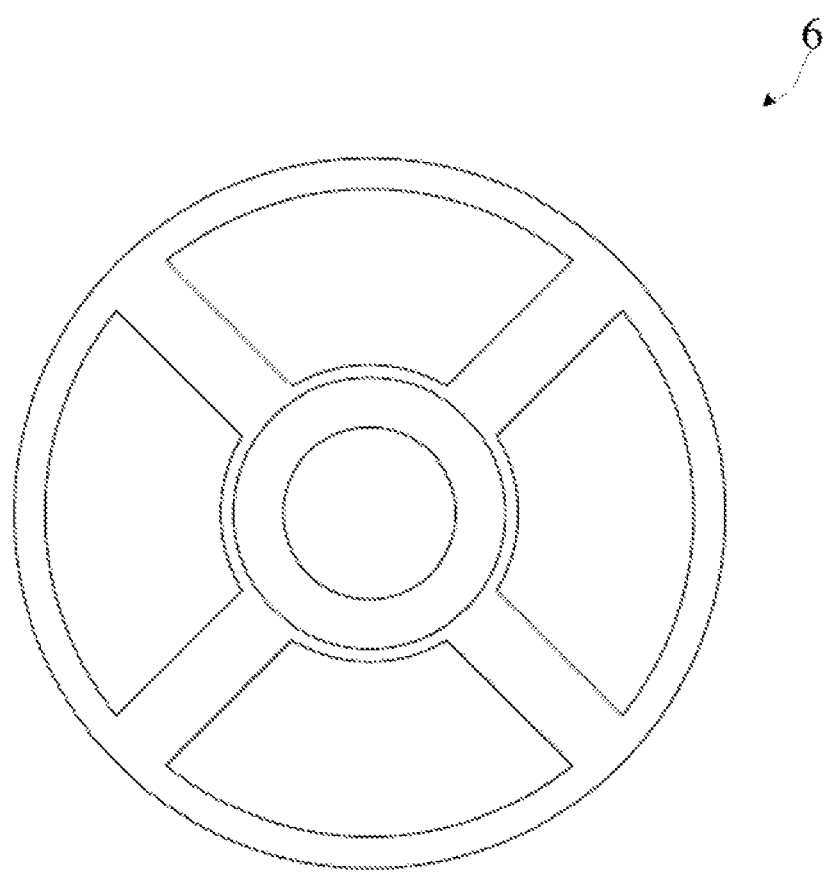
FIG. 5 is a schematic view of a rotor bushing in FIG. 1.

Referring to FIG. 5, FIG. 5 is a schematic view of the rotor bushing in FIG. 1. As shown in FIGS. 1 and 5, the rotor bushing 6 is used for fixing the axial magnetic steel 7 at the end surface of the rotor core 4, and in this embodiment, the rotor bushing 6 is made of a permeable material to allow the magnetic field lines of the axial magnetic steel 7 to pass through (referring to the foregoing descriptions for the details). That is, in this embodiment, the rotor bushing 6 also can be used for assisting to form the magnetic field line loop of the axial magnetic steel 7.

The advantages of this embodiment can be verified through specific experiment data described below. If an electric machine in which the material of the magnetic steel is neodymium iron boron is taken as a reference group, wherein the specification of the electric machine includes "an outer diameter of 270 mm, a axial length of 153 mm, and an air gap length of 0.8 mm", and the electric machine only has a tangential magnetic steel inserted in the rotor core. If the background art merely changing the material of the magnetic steel from the neodymium iron boron to ferrite is adopted for the electric machine, the air gap flux density of the electric machine is decreased by 30%. If the electric machine provided by the invention is adopted, which not only has the tangential magnetic steel inserted in the rotor core, but also has axial magnetic steels installed at two ends of the rotor core, when the material of magnetic steel is also assumed to be ferrite, then It can be known from calculation that, when the volume of the ferrite magnetic steel is about 6.1 times as large as that of the neodymium iron boron magnetic steel, the air gap flux density of the electric machine of this embodiment using the ferrite magnetic steel is substantially equal to that of the electric machine using the neodymium iron boron magnetic steel. However, since the material of the magnetic steel used in this embodiment is ferrite with a relative low price, in comparison with the relative expensive material, neodymium iron boron magnetic steel, originally adopted by the reference group, the overall magnetic steel cost is decreased to 28% of the overall magnetic steel cost of the reference group. In comparison with the background art in which the length of the tangential magnetic steel is increased to provide the air gap flux density (the volume of the electric machine is thus increased), the electric machine of this embodiment does not increase the volume of the electric machine. Furthermore, in comparison with the current composite rotor magnetic path structure, since the magnetic steel of this embodiment is installed at two ends of the rotor core rather than in the rotor core, no limitation will be imposed on the volume of the magnetic steel of this embodiment.

Figure 6:
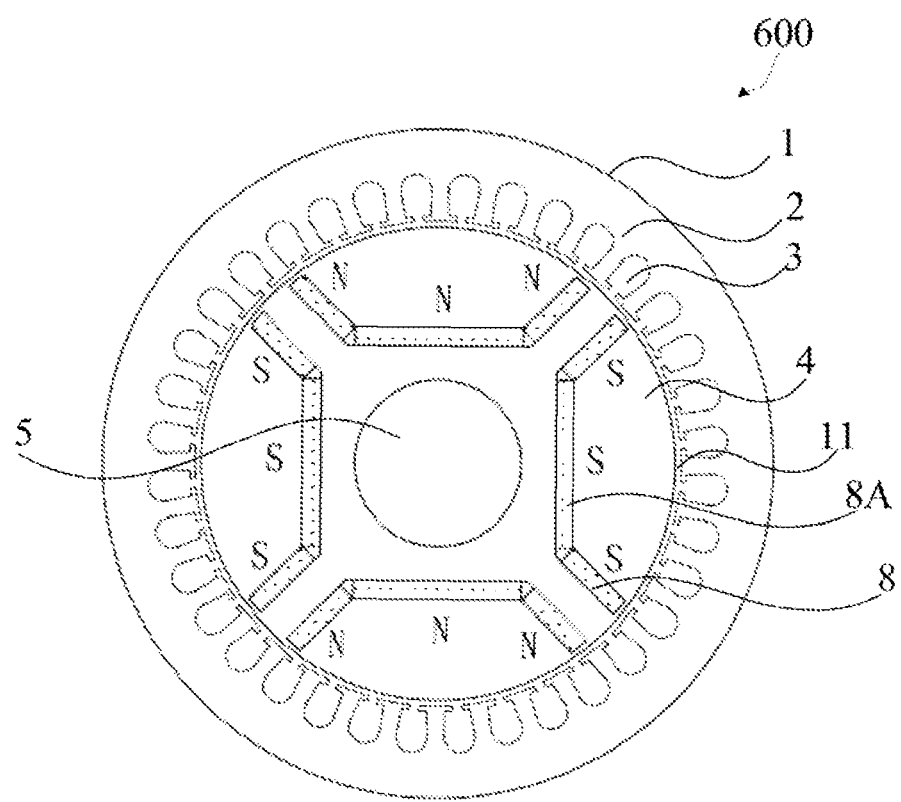
FIG. 6 is a cross-sectional view of a rotary electric machine in another embodiment of the invention.

Referring to FIG. 6, FIG. 6 is a cross-sectional view of a rotary electric machine in another embodiment of the invention. As shown in FIG. 6, the difference between a rotary electric machine 600 and the rotary electric machine 100 is that the rotary electric machine 600 adopts a composite structure. That is, in the direction parallel to the shaft 5, the rotary electric machine 600 not only has the tangential magnetic steels 8 inserted in the rotor core 4, but also has radial magnetic steels 8A inserted in the rotor core 4. The radial magnetic steels 8A are fixed in the rotor core 4 along a direction parallel to the shaft 5 and are adjacent to the tangential magnetic steels 8. In this embodiment, the axial magnetic steels (not shown) may also be installed at two ends of the rotor core 4. The specific installing position and structure of the axial magnetic steels can be known with reference to FIGS. 1 and 3, and no further description will be stated herein. The magnetic field lines of the axial magnetic steels are the same as the magnetic field lines shown in FIG. 4 (e.g., A1 and A2). In this embodiment, since axial magnetic steels are added at two ends of the rotor core 4, the air gap flux density is further improved.

Figure 7:
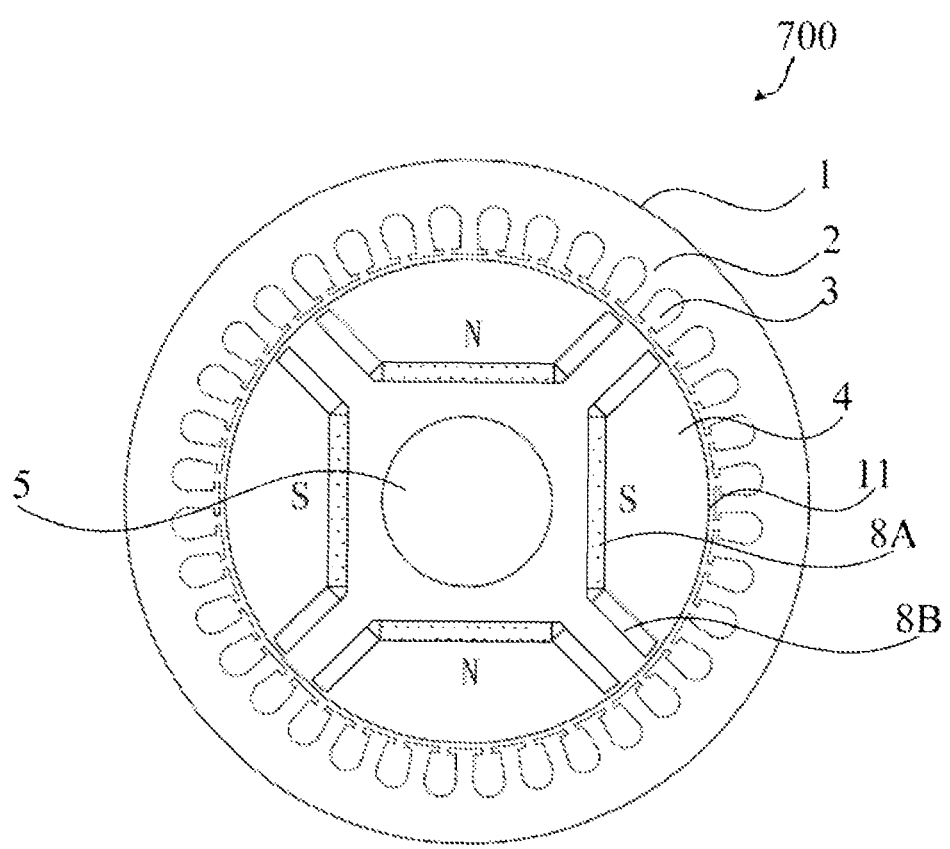
FIG. 7 is a cross-sectional view of a rotary electric machine in a further embodiment of the invention.

Referring to FIG. 7, FIG. 7 is a cross-sectional view of a rotary electric machine in a further embodiment of the invention. As shown in FIG. 7, the difference between a rotary electric machine 700 and the rotary electric machine 600 is that the rotary electric machine 700 adopts a radial structure. That is, the rotary electric machine 700 has the radial magnetic steels 8A and does not have the tangential magnetic steels.

Particularly, in this embodiment, the rotor includes the radial magnetic steels 8A, magnetic isolation grooves 8B and axial magnetic steels (not shown). Each of the radial magnetic steels 8A is fixed in the rotor core 4 along a direction parallel to the shaft 5, and has magnetic poles S and N. The magnetic isolation grooves 8B are arranged in the rotor core 4 along the radial directions of the rotor core 4, and are adjacent to the radial magnetic steels 8A. The axial magnetic steels are installed at two end surfaces of the rotor core 4 and specific details can be known with reference to FIGS. 1 and 3. In this embodiment, the radial magnetic steels 8A and the axial magnetic steels have certain polar relations. Particularly, in two magnetic poles of the radial magnetic steel 8A, both the magnetic pole thereof located farther away from the shaft 5 and the magnetic pole of the axial magnetic steel at the face adjacent to the rotor core 4 repel each other. In this embodiment, the magnetic isolation groove 8B is arranged radial to the position between each two axial magnetic steels. Preferably, the magnetic isolation groove 8B is an air magnetic isolation groove.

In this embodiment, the magnetic field lines of the axial magnetic steels are the same as the magnetic field lines shown in FIG. 4 (e.g., A1 and A2), and thus no further description will be stated herein.

In this embodiment, the magnetic isolation grooves 8B may be used for blocking the magnetic field lines of the axial magnetic steels from passing through, thereby preventing the magnetic field lines of the axial magnetic steels from extending from the N poles of the axial magnetic steels along the rotor core 4 and directly entering the S poles of the adjacent axial magnetic steels without passing through the air gap 11 and the stator core 2. In this embodiment, in a similar way, the axial magnetic steels (not shown) may also be installed at two ends of the rotor core 4.

In this embodiment, one or more magnetic isolation grooves 8B may also be replaced by the tangential magnetic steels. That is, the tangential magnetic steel and the magnetic isolation groove 8B are mixed and arranged in the rotor core 4.

Figure 8:
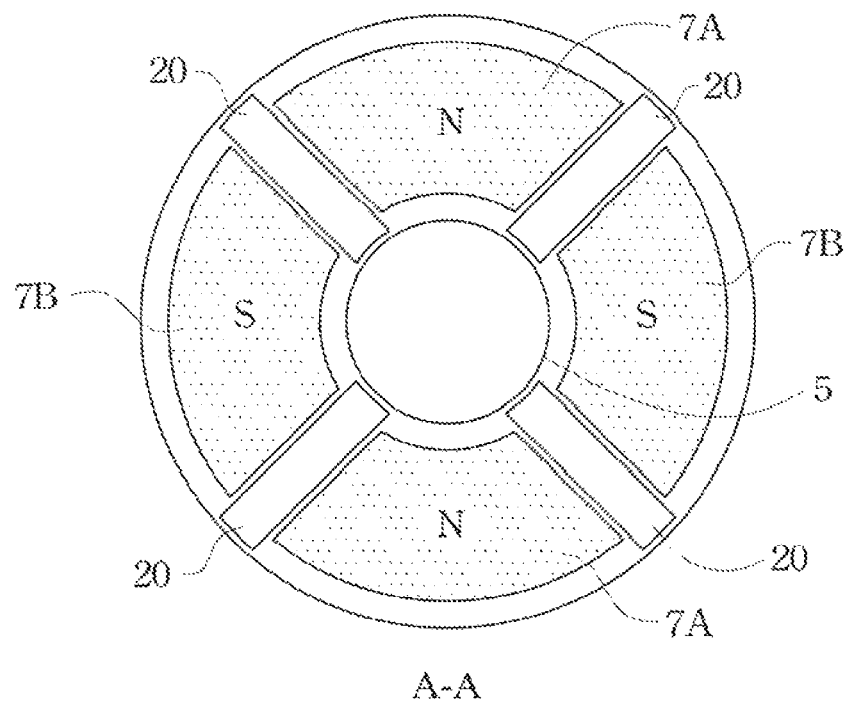
FIG. 8 is a sectional view of another embodiment of the rotary electric machine of the invention along line A-A in FIG. 1.
Figure 9:
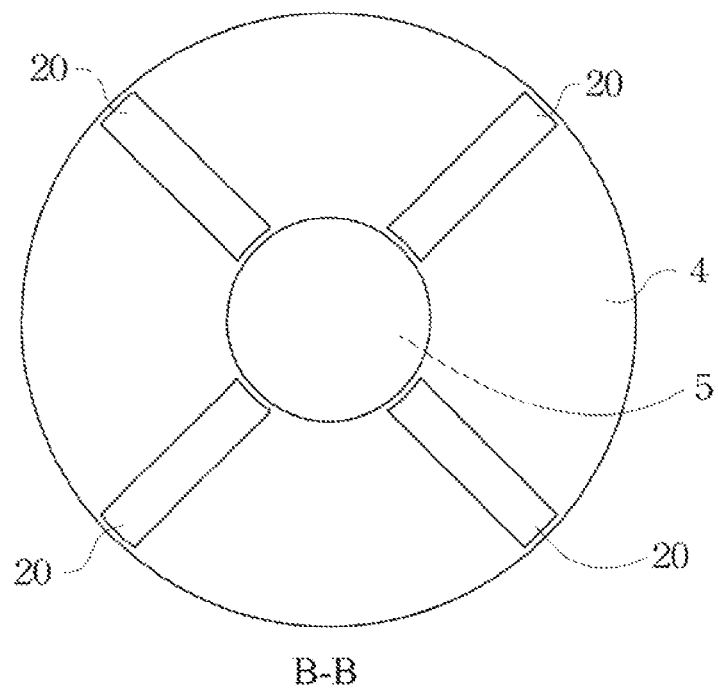
FIG. 9 is a sectional view of another embodiment of the rotary electric machine of the invention along line B-B in FIG. 1.

Referring to FIG. 8 and FIG. 9, FIG. 8 is a sectional view of another embodiment of the rotary electric machine of the invention along line A-A in FIG. 1, and FIG. 9 is a sectional view of another embodiment of the rotary electric machine of the invention along line B-B in FIG. 1. A rotor includes a shaft 5, a rotor core 4, a plurality of first axial magnetic steels 7A, a plurality of second axial magnetic steels 7B, a rotor bushing 6 (see FIG. 1), and a plurality of first magnetic isolation grooves 20. The rotor core 4 is coaxial connected to the shaft 5. The shaft 5 is made of non-magnetic material. The first axial magnetic steels 7A are disposed on an end surface of the rotor core 4. The first axial magnetic steel 7A has a first pole facing the rotor core 4. The second axial magnetic steels 7B are also disposed at the end surface of the rotor core 4. The second axial magnetic steel 7B has a second pole facing the rotor core 4. The first axial magnetic steels 7A and the second axial magnetic steels 7B are alternatively arranged, and the first pole is opposite to the second pole. For example, the first pole is N pole when the second pole is S pole. Namely, the magnetizing directions of the adjacent magnetic steels on the same end surface are opposite to each other.

The rotor bushing 6 (see FIG. 1) is disposed at a side of the first axial magnetic steel 7A and the second axial magnetic steel 7B opposite to the rotor core 4. The first magnetic isolation grooves 20 are formed on in the rotor core 4 along a radius direction of the rotor core 4. The first magnetic isolation grooves 20 are disposed between the first axial magnetic steels 7A and the second axial magnetic steels 7B respectively for isolating the first poles and the second poles. The first magnetic isolation grooves 20 can be cavities. The first magnetic isolation grooves 20 can be regarded as air magnetic isolation grooves for isolating the first poles and the second poles, such that the first poles and the second poles are arranged alternatively.

Figure 10:
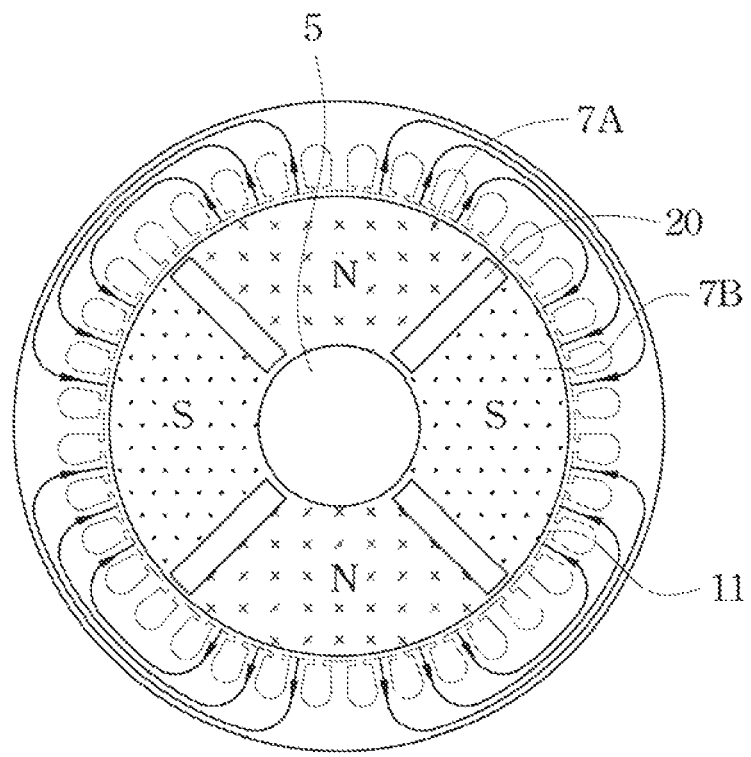
FIG. 10 is a schematic magnetic path view of the magnetic steel in FIG. 8.

Referring to FIG. 10, FIG. 10 is a schematic magnetic path view of the magnetic steel in FIG. 8. As shown in FIG. 10, the first poles of the first axial magnetic steels 7A can be N pole, and the second poles of the second axial magnetic steels 7B adjacent to the first axial magnetic steels 7A can be S pole. The first magnetic isolation grooves 20 are disposed between the first axial magnetic steels 7A and the second axial magnetic steels 7B respectively for isolating the first poles and the second poles. The magnetic lines of the first axial magnetic steels 7A are extended from the N poles, and reach the S poles of the second axial magnetic steels 7B through the air gap 11 and the stator core 2. The first magnetic isolation grooves 20 are utilized to block the magnetic field lines of the first axial magnetic steels 7A and the second axial magnetic steels 7B from passing through. The magnetic field lines cannot pass through the first magnetic isolation grooves 20 directly. Therefore, instead of the magnetic field lines from the N poles of the first axial magnetic steels 7A reach the S poles of the second axial magnetic steels 7B through the rotor core 4 (see FIG. 9) directly, the magnetic field lines extended from the N poles of the first axial magnetic steels 7A reach the S poles of the second axial magnetic steels 7B through the air gap 11 and the stator core 2 (see FIG. 9).

It should be pointed out that, the shaft 5 in FIG. 10 is made of non-magnetic material, which is more expensive than the conventional magnetic shaft. In order to reduce the cost, the shaft 5 can be also made of magnetic material, and the rotary electric machine may further include a second magnetic isolation groove for reducing magnetic field leakage. Details thereof are described in the following embodiments.

Referring to FIG. 11 to FIG. 19, which are sectional views of different embodiments of the rotor of the rotary electric machine of the invention. The sectional position of FIG. 11 to FIG. 19 is the same as the sectional position of FIG. 9. The second magnetic isolation grooves 21 may have different type. The second magnetic isolation grooves 21 are mainly disposed near the first magnetic isolation grooves 20 and the shaft 5, and the shaft 5 herein is made of magnetic material. More particularly, the second magnetic isolation grooves 21 are formed in the rotor core 4 and are disposed at an end of the first magnetic isolation grooves 20 near the shaft 5. The second magnetic isolation grooves 21 are extended toward the first pole, the second pole, or both the first and second poles.

Figure 11:
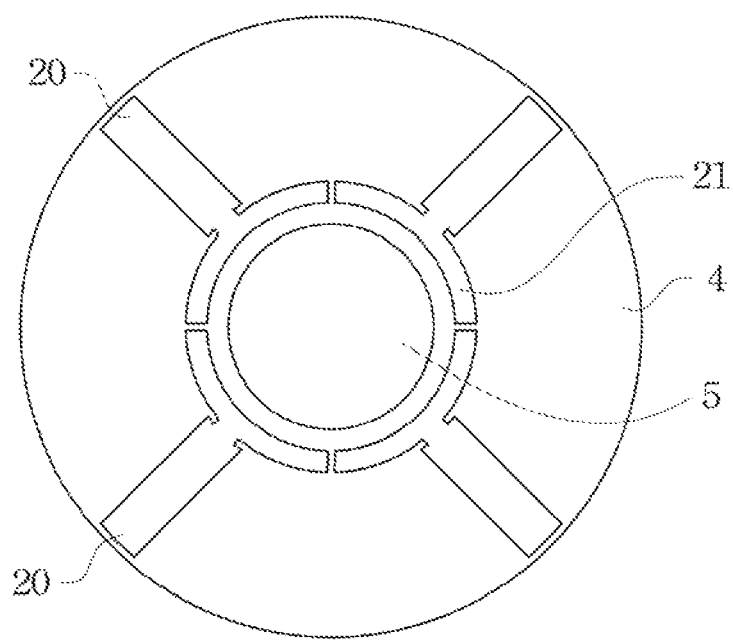
FIG. 11 to FIG. 19 are sectional views of different embodiments of the rotor of the rotary electric machine of the invention.

As shown in FIG. 11, the second magnetic isolation grooves 21 are disposed at the end of the first magnetic isolation grooves 20 near the shaft 5. The second magnetic isolation grooves 21 are connected to the first magnetic isolation grooves 20. Two ends of the second magnetic isolation grooves 21 are extended to both the first pole and the second pole, and the lengths of the second magnetic isolation grooves 21 extended to the first and second poles are equal. The second magnetic isolation grooves 21 can be curved grooves. The second magnetic isolation grooves 21 are symmetrical along an axial extending line of the first magnetic isolation grooves 20. There is a distance between the adjacent second magnetic isolation grooves 21 for maintaining the mechanism strength of the rotor core 4.

Figure 12:
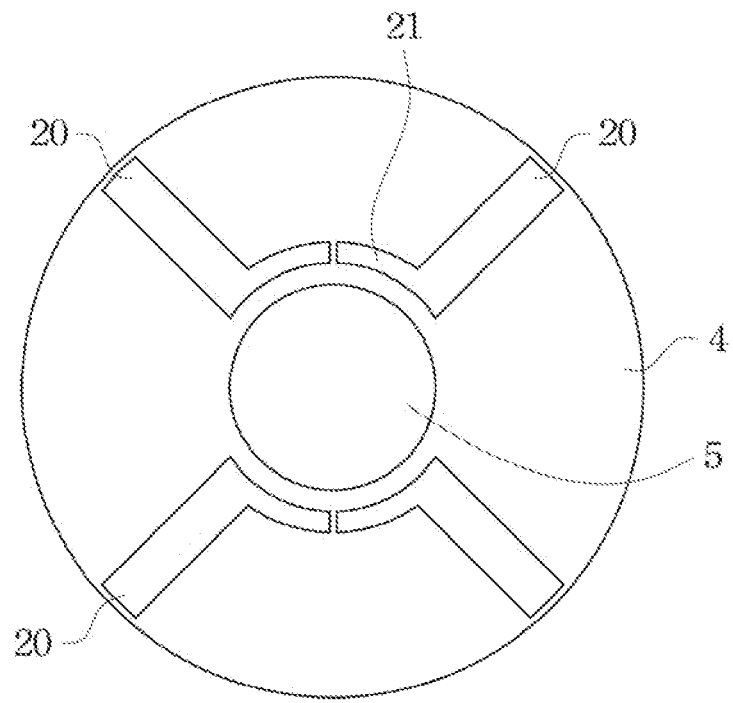

As shown in FIG. 12, the second magnetic isolation grooves 21 are disposed at the end of the first magnetic isolation grooves 20 near the shaft 5. The second magnetic isolation grooves 21 are connected to the first magnetic isolation grooves 20. The second magnetic isolation grooves 21 are only extended toward the first poles or the second poles, the second magnetic isolation grooves 21 are extended toward the first poles in this embodiment. The lengths of the second magnetic isolation grooves 21 extended to the first poles are substantially equal. The second magnetic isolation grooves 21 can be curved grooves. The second magnetic isolation grooves 21 are disposed on the same poles. There is a distance between the adjacent second magnetic isolation grooves 21 for maintaining the mechanism strength of the rotor core 4.

Figure 13:
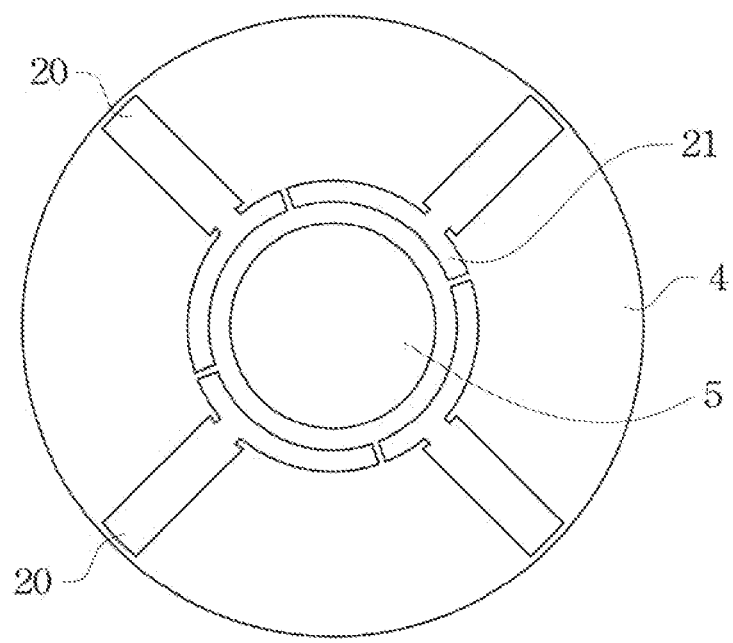

As shown in FIG. 13, the second magnetic isolation grooves 21 are disposed at the end of the first magnetic isolation grooves 20 near the shaft 5. The second magnetic isolation grooves 21 are connected to the first magnetic isolation grooves 20. Two ends of the second magnetic isolation grooves 21 are extended to both the first pole and the second pole, and the lengths of the second magnetic isolation grooves 21 extended to the first and second poles are different. For example, when one of the second magnetic isolation grooves 21 is extended longer toward the first pole and shorter toward the second pole, the adjacent second magnetic isolation groove 21 is extended longer toward the second pole and shorter toward the first pole. The second magnetic isolation grooves 21 can be curved grooves. There is a distance between the adjacent second magnetic isolation grooves 21 for maintaining the mechanism strength of the rotor core 4.

Figure 14:
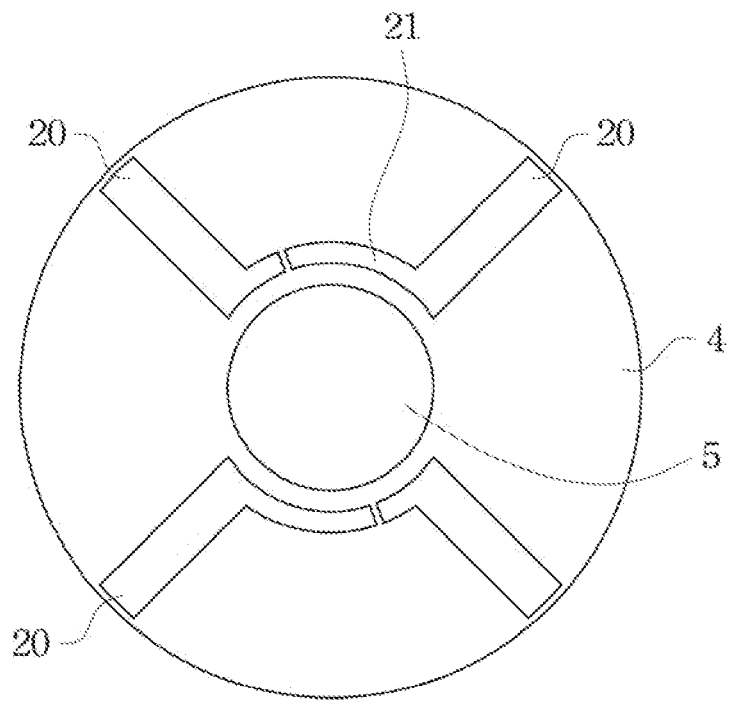

As shown in FIG. 14, the second magnetic isolation grooves 21 are disposed at the end of the first magnetic isolation grooves 20 near the shaft 5. The second magnetic isolation grooves 21 are connected to the first magnetic isolation grooves 20. The second magnetic isolation grooves 21 are only extended toward the first poles or the second poles, the second magnetic isolation grooves 21 are extended toward the first poles in this embodiment. The lengths of the second magnetic isolation grooves 21 extended toward the first poles are different. The second magnetic isolation grooves 21 can be curved grooves. The second magnetic isolation grooves 21 are disposed on the same poles. There is a distance between the adjacent second magnetic isolation grooves 21 for maintaining the mechanism strength of the rotor core 4.

Figure 15:
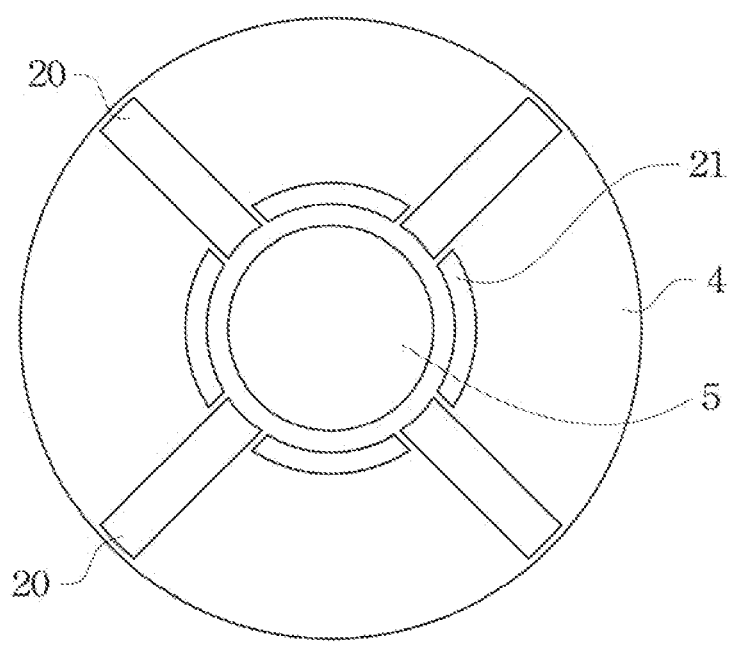

As shown in FIG. 15, the second magnetic isolation grooves 21 are disposed at the end of the first magnetic isolation grooves 20 near the shaft 5. The second magnetic isolation grooves 21 are not connected to the first magnetic isolation grooves 20. The second magnetic isolation grooves 21 are disposed on the first poles or the second poles, and the second magnetic isolation grooves 21 are disposed between two of the first magnetic isolation grooves 20 respectively. In this embodiment, both of the first poles and the second poles have the second magnetic isolation grooves 21 disposed thereon. The second magnetic isolation grooves 21 can be curved grooves.

Figure 16:
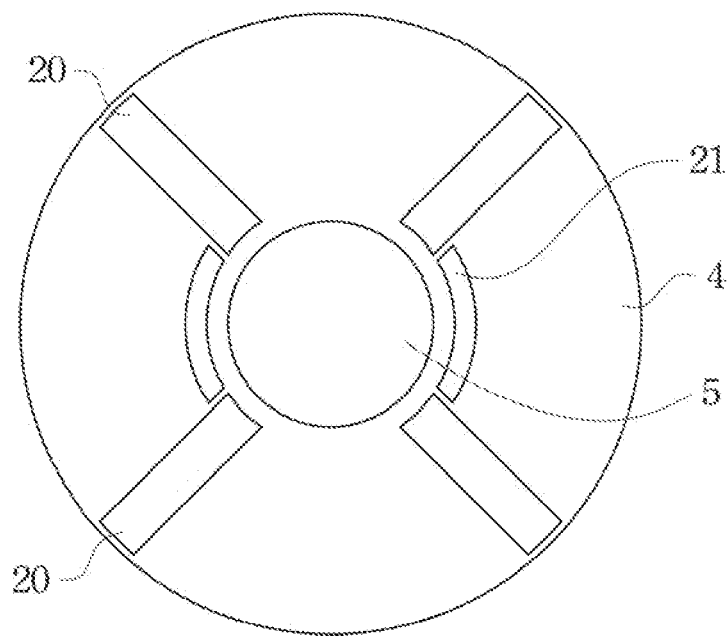

As shown in FIG. 16, the second magnetic isolation grooves 21 are disposed at the end of the first magnetic isolation grooves 20 near the shaft 5. The second magnetic isolation grooves 21 are not connected to the first magnetic isolation grooves 20. The second magnetic isolation grooves 21 are disposed on the first poles or the second poles, and the second magnetic isolation grooves 21 are disposed between two of the first magnetic isolation grooves 20 respectively. In this embodiment, only the second poles have the second magnetic isolation grooves 21 disposed thereon. The second magnetic isolation grooves 21 can be curved grooves.

Figure 17:
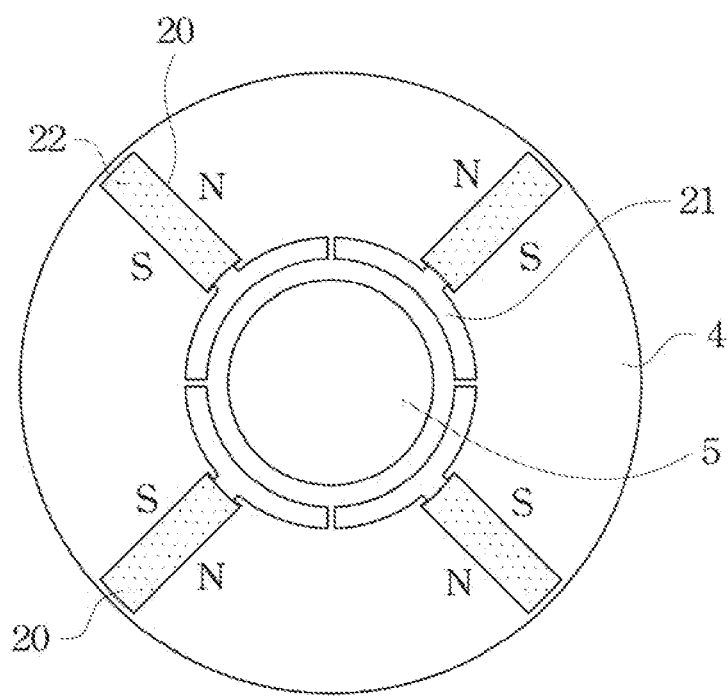

As shown in FIG. 17, the second magnetic isolation grooves 21 are disposed at the end of the first magnetic isolation grooves 20 near the shaft 5. The second magnetic isolation grooves 21 are connected to the first magnetic isolation grooves 20. Two ends of the second magnetic isolation grooves 21 are extended to both the first pole and the second pole, and the lengths of the second magnetic isolation grooves 21 extended to the first and second poles are equal. The second magnetic isolation grooves 21 can be curved grooves. The second magnetic isolation grooves 21 are symmetrical along an axial extending line of the first magnetic isolation grooves 20. There is a distance between the adjacent second magnetic isolation grooves 21 for maintaining the mechanism strength of the rotor core 4.

In order to further enhance magnetic isolation ability of the first magnetic isolation grooves 20 and the air gap flux density of the rotor, the rotor may further include a plurality of first magnetic steels 22 disposed in the first magnetic isolation grooves 20 respectively. The first magnetic steel 22 has a third pole and a fourth pole. Each of the first magnetic steels 22 is disposed between the first pole and the second pole. The third pole is disposed next to the first axial magnetic steel 7A (see FIG. 8). The third pole and the first pole repel each other. The fourth pole is disposed next to the second axial magnetic steel 7B (see FIG. 8). The fourth pole and the second pole repel each other.

Figure 18:
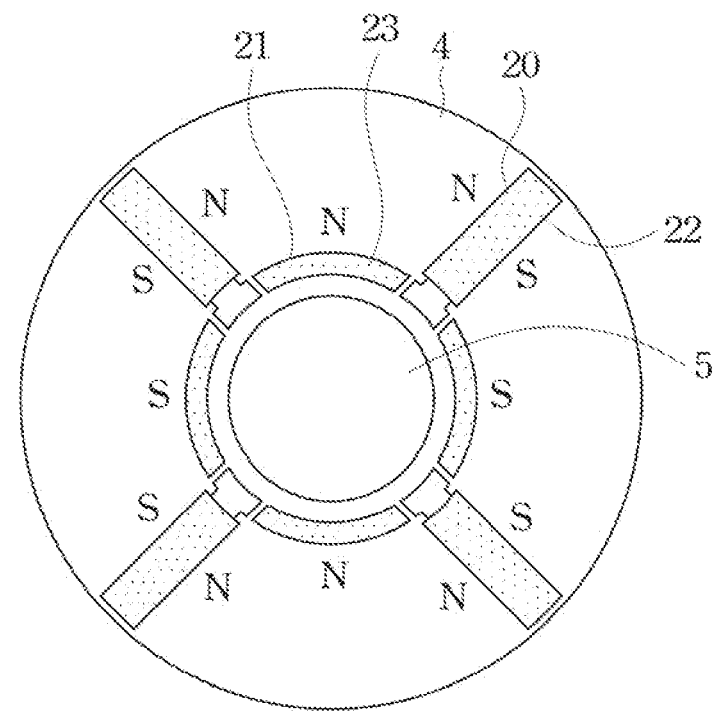

As shown in FIG. 18, the second magnetic isolation grooves 21 are disposed at the end of the first magnetic isolation grooves 20 near the shaft 5. The second magnetic isolation grooves 21 are not connected to the first magnetic isolation grooves 20. The second magnetic isolation grooves 21 are disposed on the first poles or the second poles, and the second magnetic isolation grooves 21 are disposed between two of the first magnetic isolation grooves 20 respectively. In this embodiment, both of the first poles and the second poles have the second magnetic isolation grooves 21 disposed thereon. The second magnetic isolation grooves 21 can be curved grooves.

In order to further enhance magnetic isolation ability of the first magnetic isolation grooves 20 and the air gap flux density of the rotor, the rotor may further include a plurality of first magnetic steels 22 and a plurality of second permanent magnets 23. The first magnetic steels 22 are disposed in the first magnetic isolation grooves 20 respectively. The first magnetic steel 22 has a third pole and a fourth pole. Each of the first magnetic steels 22 is disposed between the first pole and the second pole. The third pole is disposed next to the first axial magnetic steel 7A (see FIG. 8). The third pole and the first pole repel each other. The fourth pole is disposed next to the second axial magnetic steel 7B (see FIG. 8). The fourth pole and the second pole repel each other. An end of the first magnetic isolation grooves 20 next to the shaft 5 can be filled with or partially with the first magnetic steels 22 according to different requirements.

The second permanent magnets 23 are disposed in the second magnetic isolation grooves 21 respectively, and the second permanent magnets 23 have the same magnetizing direction with the magnetic pole of which located on. For example, the second permanent magnet 23 has the single magnetizing direction same as the magnetic pole of which located on when the second permanent magnet 23 is disposed on the single magnetic pole. When the second permanent magnet 23 crosses two magnetic poles, the second permanent magnet 23 can be consisted of two sub permanent magnets or the magnetizing directions of two ends of the second permanent magnet 23 can be pre-changed.

The first magnetic steels 22 and the second permanent magnets 23 can be made of ferrite or NdFeB. The first magnetic steels 22 and/or the second permanent magnets 23 can be optionally used in the embodiments of the rotor as disclosed in FIG. 11 to FIG. 16. Placing the first magnetic steels 22 in the first magnetic isolation grooves 20 and/or placing the second permanent magnets 23 in the second magnetic isolation grooves 21 can increase the air gap flux density and the power of rotary electric machine without increasing the volume of the rotor.

Figure 19:
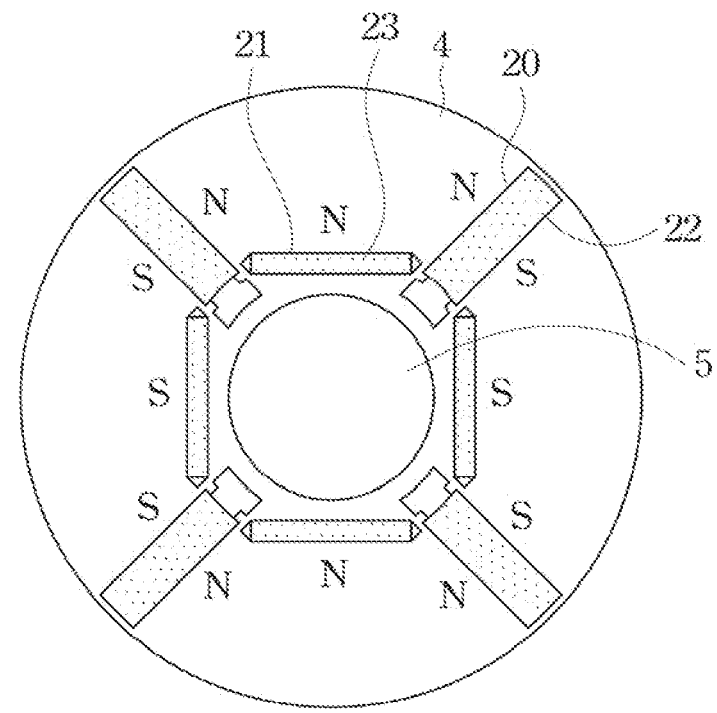

As shown in FIG. 19 the second magnetic isolation grooves 21 are disposed at the end of the first magnetic isolation grooves 20 near the shaft 5. The second magnetic isolation grooves 21 are not connected to the first magnetic isolation grooves 20. The second magnetic isolation grooves 21 are linear grooves. The second magnetic isolation grooves 21 are disposed along a tangential direction of the shaft 5 and are disposed on the first pole or the second pole. The second magnetic isolation grooves 21 can be only disposed on the first poles or the second poles. The second magnetic isolation grooves 21 can be disposed on the first poles and the second poles.

Similarly, in order to further enhance magnetic isolation ability of the first magnetic isolation grooves 20 and the air gap flux density of the rotor, the rotor may optionally include a plurality of first magnetic steels 22 and a plurality of second permanent magnets 23. The first magnetic steels 22 are disposed in the first magnetic isolation grooves 20 respectively. The first magnetic steel 22 has a third pole and a fourth pole. Each of the first magnetic steels 22 is disposed between the first pole and the second pole. The third pole and the first pole repel each other. The fourth pole and the second pole repel each other. An end of the first magnetic isolation grooves 20 next to the shaft 5 can be filled with or partially with the first magnetic steels 22 according to different requirements. The second permanent magnets 23 are disposed in the second magnetic isolation grooves 21 respectively, and the second permanent magnets 23 have the same magnetizing direction with the magnetic pole of which located on. Two opposite ends of the second magnetic isolation grooves 21 can be filled with or without the second permanent magnet 23.

In view of the above, in the rotary electric machine provided by the invention, the axial magnetic steels are installed at two ends of the rotor core, so that the air gap flux density may be improves and the output power of the electric machine may be enlarged without increasing the original volume of the electric machine. The rotary electric machine provided by the invention is suitable for improve the air gap flux density by arranging the first magnetic steel or the second permanent magnets in the rotor without increasing the volume of the electric machine, and is especially appropriate for applying magnetic steels with low magnetic energy product in the electric machine. As such, the air gap flux density may be improved without increasing the volume of the rotary electric machine, and the cost of the rotary electric machine may be reduced.

Although the invention has been disclosed with reference to the above embodiments, these embodiments are not intended to limit the invention. It will be apparent to those skilled in the art that various modifications and variations can be made without departing from the spirit and scope of the invention. Therefore, the scope of the invention shall be defined by the appended claims.

What is claimed is:

1. A rotor, comprising:
a shaft;
a rotor core coaxially connected to the shaft;

a first axial magnetic steel disposed at an end surface of the rotor core, wherein the first axial magnetic steel has a first magnetic pole facing the rotor core;

a second axial magnetic steel disposed at the end surface of the rotor core, wherein the second axial magnetic steel has a second magnetic pole facing the rotor core;

a rotor bushing disposed at a side of the first axial magnetic steel and the second axial magnetic steel opposite to the rotor core; and a first magnetic isolation groove formed in the rotor core along a radius direction of the rotor core, wherein the first magnetic isolation groove is disposed between the first axial magnetic steel and the second axial magnetic steel to isolate the first magnetic pole and the second magnetic pole.

2. The rotor of claim 1, further comprising a second magnetic isolation groove disposed in the rotor core and disposed at an end of the first magnetic isolation groove close to the shaft, wherein the second magnetic isolation groove is extended toward the first magnetic pole, or the second magnetic pole, or both of the first and the second magnetic poles.

3. The rotor of claim 2, wherein the shaft is made of a magnetic material.

4. The rotor of claim 2, wherein the second magnetic isolation groove is a curved groove or a linear groove.

5. The rotor of claim 2, wherein the second magnetic isolation groove is symmetrical along an axial extending line of the first magnetic isolation groove.

6. The rotor of claim 2, wherein the second magnetic isolation groove is disposed along a tangential direction of the shaft and is disposed on the first magnetic pole or the second magnetic pole.

7. The rotor of claim 2, further comprising a first magnetic steel disposed in the first magnetic isolation groove, the first magnetic steel having a third magnetic pole and a fourth magnetic pole, wherein the third magnetic pole is disposed next to the first magnetic pole, and the third magnetic pole and the first magnetic pole repel each other; the fourth magnetic pole is disposed next to the second magnetic pole, and the fourth magnetic pole and the second magnetic pole repel each other.

8. The motor of claim 7, further comprising a second permanent magnet disposed in the second magnetic isolation groove, wherein the second permanent magnet has the same magnetizing direction with the magnetic pole of which located on.

9. The rotor of claim 8, wherein the first magnetic steel or the second permanent magnet is made of ferrite or NdFeB.

10. A rotary electric machine comprising an electric machine stator formed from a plurality of stator windings and a stator core, and a rotor formed from a rotor core and a shaft, wherein an air gap is provided between the electric machine stator and the rotor, the rotor further comprising:

a first axial magnetic steel disposed at an end surface of the rotor core, wherein the first axial magnetic steel has a first magnetic pole facing the rotor core;

a second axial magnetic steel disposed at the end surface of the rotor core, wherein the second axial magnetic steel has a second magnetic pole facing the rotor core;

a rotor bushing disposed at a side of the first axial magnetic steel and the second axial magnetic steel opposite to the rotor core; and a first magnetic isolation groove formed in the rotor core along a radius direction of the rotor core, wherein the first magnetic isolation groove is disposed between the first axial magnetic steel and the second axial magnetic steel to isolate the first magnetic pole and the magnetic second pole, wherein a plurality of magnetic field lines pass through the air gap.

11. The rotary electric machine of claim 10, further comprising a second magnetic isolation groove disposed in the rotor core and disposed at an end of the first magnetic isolation groove close to the shaft, wherein the second magnetic isolation groove is extended toward the first magnetic pole, or the second magnetic pole, or both of the first and the second magnetic poles.

12. The rotary electric machine of claim 11, wherein the shaft is made of a magnetic material.

13. The rotary electric machine of claim 11, wherein the second magnetic isolation groove is a curved groove or a linear groove.

14. The rotary electric machine of claim 11, wherein the second magnetic isolation groove is symmetrical along an axial extending line of the first magnetic isolation groove.

15. The rotary electric machine of claim 11, wherein the second magnetic isolation groove is disposed along a tangential direction of the shaft.

16. The rotary electric machine of claim 11, further comprising a first magnetic steel disposed in the first magnetic isolation groove, the first magnetic steel having a third magnetic pole and a fourth magnetic pole, wherein the third magnetic pole is disposed next to the first magnetic pole, and the third magnetic pole and the first magnetic pole repel each other; the fourth magnetic pole is disposed next to the second magnetic pole, and the fourth magnetic pole and the second magnetic pole repel each other.

17. The rotary electric machine of claim 16, further comprising a second permanent magnet disposed in the second magnetic isolation groove, wherein the second permanent magnet has the same magnetizing direction with the magnetic pole of which located on.

18. The rotary electric machine of claim 17, wherein the first magnetic steel or the second permanent magnet is made of ferrite or NdFeB.

* * * * *